(12) United States Patent
Azzouz et al.

(10) Patent No.: US 12,176,500 B2
(45) Date of Patent: Dec. 24, 2024

(54) BATTERY EQUIPPED WITH A TEMPERATURE REGULATION DEVICE USING A DIELECTRIC FLUID

(71) Applicant: Valeo Systemes Thermiques, Le Mesnil Saint-Denis (FR)

(72) Inventors: Kamel Azzouz, Le Mesnil Saint Denis (FR); Amrid Mammeri, Le Mesnil Saint Denis (FR); Imad Chelali, Le Mesnil Saint Denis (FR); Sébastien Garnier, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 550 days.

(21) Appl. No.: 17/525,580

(22) Filed: Nov. 12, 2021

(65) Prior Publication Data

US 2022/0069375 A1   Mar. 3, 2022

Related U.S. Application Data

(63) Continuation of application No. PCT/EP2020/063756, filed on May 18, 2020.

(30) Foreign Application Priority Data

May 21, 2019 (FR) ........................ 1905295

(51) Int. Cl.
*H01M 10/613* (2014.01)
*H01M 10/6569* (2014.01)
(Continued)

(52) U.S. Cl.
CPC ..... *H01M 10/613* (2015.04); *H01M 10/6569* (2015.04); *H01M 50/209* (2021.01); *H01M 50/213* (2021.01)

(58) Field of Classification Search
CPC ........................ H01M 10/613; H01M 10/6556
(Continued)

(56) References Cited

U.S. PATENT DOCUMENTS 7,477,513 B1 *   1/2009   Cader ................. H01L 23/4735
                                                       257/714
2011/0151302 A1   6/2011   Kim
(Continued)

FOREIGN PATENT DOCUMENTS

CN          106848478 A         6/2017
CN          206628562 U    *   11/2017   ............ H01M 10/04
(Continued)

OTHER PUBLICATIONS

Office Action Issued in corresponding CN application No. 202080037372.5, Dated Mar. 25, 2023 ( 8 Pages).
(Continued)

*Primary Examiner* — James M Erwin
*Assistant Examiner* — Kevin Nguyen
(74) *Attorney, Agent, or Firm* — Osha Bergman Watanabe & Burton LLP (57) ABSTRACT

A battery includes at least one row of energy storage cells. The row of energy storage cells has a longitudinal extension direction with an upper side and lateral sides being respectively defined by a series of upper and lateral faces of the energy storage cells and of spaces separating the energy storage cells in the longitudinal extension direction. The battery also includes a dielectric fluid circuit with one or more spray orifices. The spray orifices are flush with the upper side of the row of energy storage cells and are located facing a lateral side of the row such that the dielectric fluid circuit leaves the upper side of the row free.

8 Claims, 8 Drawing Sheets

(51) Int. Cl.
*H01M 50/209* (2021.01)
*H01M 50/213* (2021.01)

(58) Field of Classification Search
USPC .......................................................... 429/120
See application file for complete search history.

(56) References Cited

U.S. PATENT DOCUMENTS

| 2011/0200860 A1* | 8/2011 | Brodie .................... B60L 1/003 |
| | | 429/120 |
| 2017/0125860 A1 | 5/2017 | Chatroux et al. |
| 2019/0097288 A1 | 3/2019 | Oh et al. |

FOREIGN PATENT DOCUMENTS

| DE | 102017212210 A1 | 1/2019 | |
| DE | 102017212211 A1 | 1/2019 | |
| EP | 3166175 A1 | 5/2017 | |
| FR | 2774463 A1 | 8/1999 | |
| WO | 2012080039 A2 | 6/2012 | |
| WO | WO-2016021286 A1 * | 2/2016 | ............ H01M 10/04 |
| WO | 2018105878 A1 | 6/2018 | |
| WO | 2019015861 A1 | 1/2019 | |

OTHER PUBLICATIONS

International Search Report and Written Opinion issued in corresponding International Patent Application No. PCT/EP2020/063756, mailed on Jun. 25, 2020 (12 pages).

* cited by examiner

BATTERY EQUIPPED WITH A TEMPERATURE REGULATION DEVICE USING A DIELECTRIC FLUID

The invention relates to a battery equipped with a temperature regulation device using a dielectric fluid. It is particularly intended to equip motor vehicles, in particular motor vehicles with electric or hybrid motorization.

As the market share represented by electric vehicles continues to grow, the problem sets of cooling/heating the battery packs with which they are equipped are adopting strategic importance. The objective is to design the best-performing, most efficient and economical battery thermal management device possible.

"Heat exchangers" are often used to respond to the requirement for cooling/heating electric batteries, which heat exchangers are made up of a cold plate allowing circulation of a coolant, with the plates being in contact with the cells to be cooled. This type of technique leads to non-homogeneous cooling of the batteries and thus limits their lifetime and their performance. These devices also exhibit high thermal resistance because of the thicknesses of material present between the liquid coolant and the cells. One solution that is proposed in order to respond to this problem involves immersing the cells forming the electric batteries in a dielectric heat-transfer fluid. This immersion can be achieved with a circulation of fluid or under static conditions involving a phase change.

These two techniques perform well from a thermal standpoint, particularly on account of the direct contact established between the liquid and the cells, but have the disadvantage of using a large quantity of dielectric liquid, thereby increasing the cost and weight of the battery pack.

In order to overcome this disadvantage, dielectric fluid circuits are known for spraying the cells with dielectric fluid. However, the circuits proposed to date have the disadvantage of increasing the spatial requirement of the batteries, in particular the height, as well as of reducing the number of cells that can be positioned in the battery, at a given volume. Indeed, the cells must be sufficiently spaced apart from each other to allow through elements of the circuit.

The aim of the invention is to overcome these problems by proposing a battery comprising at least one row of energy storage cells, said row having a longitudinal extension direction, with an upper side and lateral sides of the row being respectively defined by a series of upper and lateral faces of the cells and of spaces separating said cells in said longitudinal extension direction, said battery further comprising a dielectric fluid circuit, said circuit comprising one or more spray orifice(s) of said cells, said one or more spray orifice(s) being flush with the upper side of the row and/or being located facing at least one of the lateral sides of said row so that said circuit leaves the upper side of the row free.

By virtue of configuring the cells in rows and of arranging the circuit as such, which circuit is laterally offset relative to the cells of the same row, the height spatial requirement of the batteries can be reduced. The upper faces of the cells thus can have electrical connection connectors without any risk of interfering with the dielectric fluid circuit. Furthermore, the cells can be brought close together within the same row since no element of the circuit is disposed between the cells, whilst maintaining efficient cooling of the batteries.

The invention can also comprise any one of the following features, taken individually or according to any technically possible combination forming as many embodiments of the invention:

- the battery comprises a sealed closed body, said body comprising said cells and at least one part, called spray part, of said circuit, said spray part comprising said spray orifices;
- the number of rows of cells is greater than two, with the rows being disposed so that their lateral sides are opposite each other forming banks of cells in a transverse extension direction, orthogonal to said longitudinal extension direction;
- the rows have a greater number of cells than the banks;
- the space between the cells of the same row ranges between 1 and 10 mm;
- said circuit comprises spray nozzles defining said spray orifices;
- said cells comprise a body, with the electrical connection connectors being located in the vicinity of an upper face of the body;
- said battery comprises a condensation plate, located facing said upper face of the cells;
- a distance separating said condensation plate from the cells ranges between 5 and 10 mm;
- said circuit comprises at least one spray ramp, provided with said spray orifices;
- the ramp is at least partially on a vertical level higher than a vertical level of the upper face of the cells;
- the ramp comprises at least one bend;
- the ramp, then called upper ramp, extends along one or more transverse edge(s) and/or one or more longitudinal edge(s) of said upper side of the row or of the rows of cells;
- the upper ramp comprises one or more longitudinal branch(es) extending along one or more longitudinal edge(s) of the upper side of the row or of the rows of cells, the one or said longitudinal branches being provided with at least some of said spray orifices;
- the upper ramp forms a ring;
- the upper ramp comprises one or more transverse branch(es) extending along one or more transverse edge(s) of said upper side of the row or of the rows of cells, the one branch or said branches being provided with at least some of said spray orifices;
- the upper ramp comprises a connecting branch connecting said transverse branches, called spray branches;
- said connection branch has a small diameter;
- the ramp, then called lateral ramp, is located opposite one of the lateral sides, called first lateral side, of the row or of the rows of cells;
- the lateral ramp comprises one or more longitudinal branch(es) extending opposite said first side, the one or more longitudinal branch(es) being provided with at least some of said spray orifices;
- the lateral ramp comprises a connection branch connecting said longitudinal branches, called spray branches;
- the lateral ramp comprises two plates connected to mutually form said spray and connection branches;
- one of said plates is provided with said spray orifices;
- one of the plates or said plates comprise a fixing skirt extending around one of the longitudinal edges of the row or of the rows of cells;
- said circuit comprises at least one spray plate, provided with the one or with said spray orifice(s);
- said plate is located opposite one of said lateral sides of the row or of the rows of cells;
- said spray orifices are evenly located on the surface of said plate.

The invention will be better understood, and further details, features and advantages of the invention will become apparent, from reading the following description, which is provided by way of a non-limiting example and with reference to the accompanying drawings, in which.

As shown in FIGS. 1 to 5, 7 and 8, the invention relates to a battery. It particularly involves a battery intended to equip a motor vehicle, in particular an electric or hybrid vehicle.

Said battery comprises at least one row 1, 2 of energy storage cells 10. The row or each of said rows has a longitudinal extension direction X, a transverse extension direction Y and a height extension direction Z. The row or each of said rows also has an upper side 12 and lateral sides 14. These sides 12, 14 are respectively defined by a series of upper 10a and lateral 10b faces of the cells and by spaces 11 separating said cells 10 in said longitudinal extension direction X.

The row or each of said rows further comprise(s) a lower side, opposite the upper side and not shown in the figures, as well as transverse sides 16, connecting each of the lateral sides 14. Said transverse sides 16 are defined by those of the cells 10 located at the end of the row.

The notions of "upper", "lower", "lateral" or "transverse" are to be understood relative to an orientation of the battery during use.

The cells are particularly of parallelepiped shape and of the same size. In the same row, they are disposed one behind the other so that their upper, lower and lateral faces are respectively located in the same plane. By way of a non-limiting example, they have dimensions of 150 mm (along Y) by 100 mm (along Z) by 27 mm (along X). Each cell 10 is separated from the neighboring cell by one of the spaces 11. Each space 11 advantageously defines the same distance between two neighboring cells 10.

By way of a variant, not shown, the cells 10 are of cylindrical shape, in particular with a circular cross-section, with a longitudinal axis of the cells 10 being oriented in said height extension direction Z. In the same row, the cells 10 are distributed as a group, with the cells of the same group being located at the same level along the X axis. Said cells 10 are then advantageously disposed in a straight or staggered manner from one group to the other along the row. In such a case, the lateral sides 14 of the row or of the rows are defined by an outwardly rotated portion of the lateral sides of those cells 10 that are located at the ends of each group, i.e. located on either side of the same group in the transverse extension direction Y. In the same row, the cells are disposed so that their upper and lower faces are respectively located in the same plane. By way of a non-limiting example, they have dimensions of 70 mm (along Z) and a diameter of 20 mm. Each group of cells 10 is separated from the neighboring group by one of the spaces 11. Each space 11 advantageously defines the same minimum distance between each cell of two neighboring groups.

In FIGS. 1 to 4, 7 and 8, a single row is provided. There are two rows in FIG. 5, with the two rows 1, 2 being disposed next to each other, with each row extending in the longitudinal extension direction X. This is by no means limiting and the battery according to the invention can comprise a greater number of rows, disposed next to each other in the transverse extension direction Y, or can comprise a plurality of stages of rows, with each row extending in the longitudinal extension direction X.

If there are more than two rows of cells, the rows are disposed so that their lateral sides are opposite each other forming banks of cells in the transverse extension direction Y, the rows have a greater number of cells 10 than the banks.

Said cells 10 comprise, for example, a body 13 and electrical connection connectors, not shown. This particularly involves connectors for connecting the cells 10 together. Said connectors are preferably located in the vicinity of an upper face 15 of the body 13.

In order for the battery to operate correctly, the temperature of the cells 10 is expected to be maintained within a limited value range, in particular between 20 and 40° C.

To this end, said battery comprises a dielectric fluid circuit 20, with said circuit comprising one or more spray orifice(s) 22 for said cells 10. In this way, said circuit 20 allows the temperature of the cells 10 to be regulated, whilst limiting the amount of dielectric fluid that is used. Indeed, the amount of fluid that is used is much less than in a device in which the cells are immersed in a dielectric fluid.

Advantageously, the spray orifices 22 are configured so as to spray the dielectric liquid in the form of fine drops, in particular in a multi-directional manner. The size of the drops can vary. It is approximately 20 μm, for example. The spray orifices 22 in particular can be configured so as to spray the fluid as a mist.

Said circuit 10 comprises, for example, spray nozzles 24 for the dielectric fluid, in the liquid phase, defining said spray orifices 22. Said spray nozzles 24 allow the fluid 3 to be sprayed toward the one or more cell(s) 10. Said nozzles 24 comprise a fluid passage channel with a diameter that particularly ranges between 50 and 500 μm.

The battery is preferably configured so that the dielectric fluid arrives in the form of drops on the surface of the cells 10 and changes phase by at least partially vaporizing under the effect of the absorbed heat.

Figure 1:
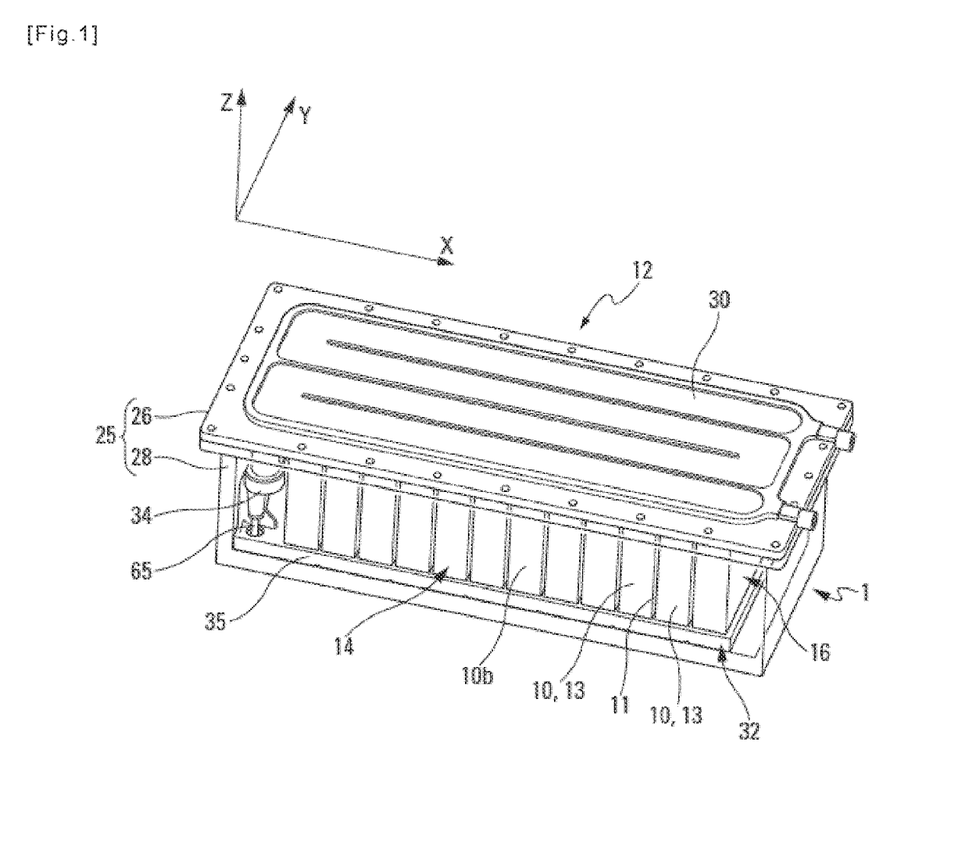
FIG. 1 shows a perspective view of a battery according to the invention.

To this end, as is more specifically shown in FIG. 1, the battery comprises a closed and sealed housing 25. Said housing 25 comprises said cells 10 and at least one portion, comprising said spray orifices 22, of said circuit 20. In this case, the housing 25 contains the entire circuit 20. Said housing 25 is particularly configured to maintain pressure conditions so that the selected dielectric fluid undergoes a phase change on the surface of the cells at a temperature ranging between 20 and 40° C., in particular of approximately 34° C.

In this case, the battery is also configured so that the portion of the dielectric fluid in the vapor phase after vaporization is condensed in order to return to the liquid phase and, preferably, so that it can be used again to spray the cells 10 in accordance with a closed loop operation.

To this end, the battery comprises a condenser, for example. In this case, said condenser comprises a condensation plate 26, with said condensation plate 26 being located facing the upper face 12 of the one or more row(s) 1, 2 of cells 10. Said condensation plate 26 advantageously forms a cover closing a body 28 of the housing 25.

Advantageously, said condensation plate 26 is configured to circulate a refrigerant intended to exchange heat with the dielectric fluid. The refrigerant circulates in the condensation plate 26 so as to lower the temperature of said plate, which allows the gaseous dielectric fluid to be condensed in the vicinity of a lower face of said condensation plate 26. The gaseous dielectric fluid thus can flow, particularly by trickling under the effect of gravity and/or by capillary action toward a lower part of the housing 25.

Said condensation plate 26 comprises, for example, two sheets stacked in the height extension direction Z. Said sheets together form one or more channel(s) 30 for circulating the refrigerant, which channels are defined, for example, by stamping the one or said sheet(s).

In this case, the battery further comprises a reservoir 32 disposed in the housing 25 under the cells 10. The reservoir 32 is capable of recovering the dielectric liquid originating from the lower face of the condensation plate 26.

The battery also comprises a pump 34 configured to draw said dielectric fluid into the reservoir 32 and to pressurize it in said dielectric fluid circuit 20.

Advantageously, said pump 34 is configured to pressurize the fluid to more than 10 bar. Thus, the pressure losses within the circuit 20 are negligible and each spray orifice 22 is subject to the same pressure.

Said pump 34 is located, for example, in the longitudinal extension of the row or of the rows 1, 2.

The fluid in the liquid phase in the reservoir 16 is then drawn in by the pump 34. The condenser 26 allows the dielectric fluid 3 to be condensed by virtue of a temperature difference between the condenser and the dielectric fluid in the vapor phase.

Thus, the dielectric fluid is successively in the liquid phase and pressurized in the circuit 20 and then, after spraying through the orifices 22, it transitions to the pressure of the housing 25, firstly in the form of droplets and then in the gaseous phase following vaporization in contact with the surface of the cells 10. It subsequently condenses in order to again transition to the liquid phase in contact with the condensation plate 26 and then trickles to the reservoir 32, where it is drawn in by the pump 34 to again pass through the circuit 20.

More generally, said orifices 22 are configured to spray the surface of the cells 10, with or without a change of phase of the dielectric fluid, the fluid may or may not circulate in a closed loop.

In the case of spraying the cells without changing the phase of the fluid, the battery can be configured to operate as a closed loop, with the fluid remaining in the liquid phase throughout the loop by trickling along the surface of the cells in order to reach the reservoir 32. Means for cooling the dielectric fluid are then advantageously provided.

In this case, said battery further comprises a base 35 supporting said cells 10. Said base 35 is placed, for example, on a bottom of the body 28 of the housing 25. In this case, it is immersed in the reservoir 32.

As is more specifically shown in FIGS. 2 to 5, 7 and 8, according to the invention, said one or more orifice(s) 22 is/are flush with the upper side 12 of the row 1 of cells 10 and/or is/are located facing at least one of the lateral sides 14 of said row, so that said circuit 20 leaves the upper side 12 of the row free.

In this way, the dielectric fluid circuit 20 is no longer in line with the row, or else only on the margin, i.e. on the periphery. Therefore, there is no longer any risk of the circuit 20 interfering with any electrical connection connectors that are located in the vicinity of the upper faces 10*a* of the cells 10. The height spatial requirement of the battery also can be decreased, by bringing its cover closer to said upper faces 10*a*. By way of an example, a distance separating said condensation plate 26 from the cells 10, i.e. the dimension, in the height extension direction Z, between the lower face of said condensation plate 26 and an apex of the connecting connections of the cells 10, ranges between 5 and 10 mm and/or is slightly bigger than the spatial requirement of said electrical connection connectors.

However, the cooling of the cells remains effective. Indeed, by operating by spraying, and more specifically by misting, the fluid reaches a sufficient surface of the cells 10, even if the circuit 20 is positioned slightly offset, in a plane extending in the longitudinal X and transverse Y extension directions, relative to said cells 10.

In order to encourage such an outcome, it is preferable for the space between the cells 10 of the same row, namely the distance in the longitudinal direction X between two neighboring cells 10, to range between 1 and 10 mm. A distance slightly above 1 mm will promote the compactness of the battery. A distance with a lower value presents a risk with respect to the proper propagation of the dielectric fluid on the surface of the cells 10.

Figure 5:
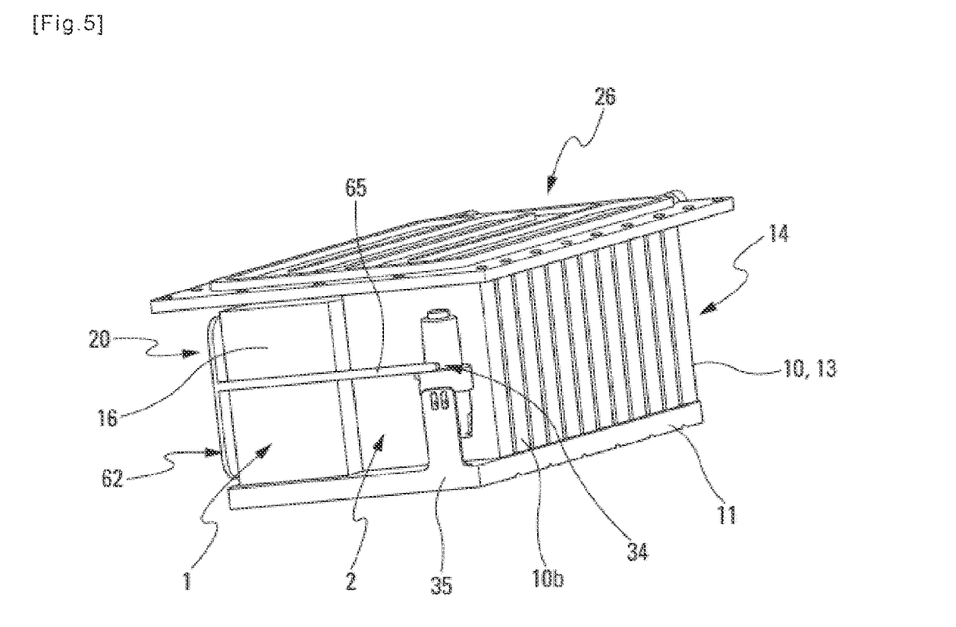
FIG. 5 shows a perspective view of a battery according to the invention equipped with a fourth embodiment of a dielectric fluid circuit, with only a cover and the inside of the battery having been shown.

For a plurality of rows, the battery can comprise as many circuits 20 as there are rows. The circuits 20 are then disposed between the neighboring rows, in said transverse extension direction Y. As a variant, as shown in FIG. 5, the same circuit 20 can be used for a plurality of neighboring rows, in said transverse extension direction Y. The same also can be the case for each possible stage of rows.

According to the various embodiments shown in FIGS. 2 to 4, 7 and 8, said circuit 20 comprises at least one spray ramp 36, 50, provided with said spray orifices 22. According to the invention, as will be understood, the ramp 36, 50 is located, as an orthogonal projection, at least partially or entirely outside a projection zone on the upper side 12 of the row 1 of cells 10. In other words, the ramp 36 is disposed at least partially or entirely outside, on the periphery and/or around the row 1. If the ramp 36, 50 is partly in line with the upper side 12 of the row 1, it is only along the edges of said upper side 12.

In order to better match the shape of the row and to promote spraying over the largest possible surface of the row, the ramp 36 comprises at least one bend 37, for example, located around an apex of one of the end cells 10 of the row.

Said spray ramp 36, 50 is advantageously located so that a misting cone originating from at least some of said nozzles 24, or even from all of said nozzles 24, fully or partly surrounds the upper side 12 of the row. To this end, and in this case, the ramp 36, 50 is at least partially on a vertical level higher than a vertical level of the upper face 10*a* of the cells 10, so that at least part of said nozzles 24 is above or immediately below the vertical level of the upper face 10*a* of the cells.

Figure 2:
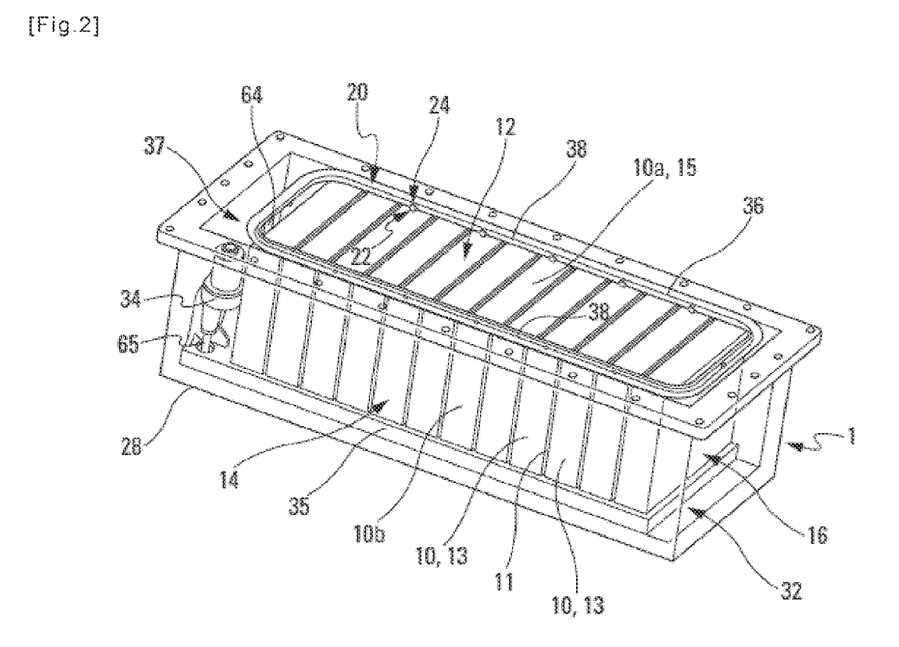
FIG. 2 shows a perspective view of the battery of FIG. 1 equipped with a first embodiment of a dielectric fluid circuit, with a cover for said battery having been removed.
Figure 3:
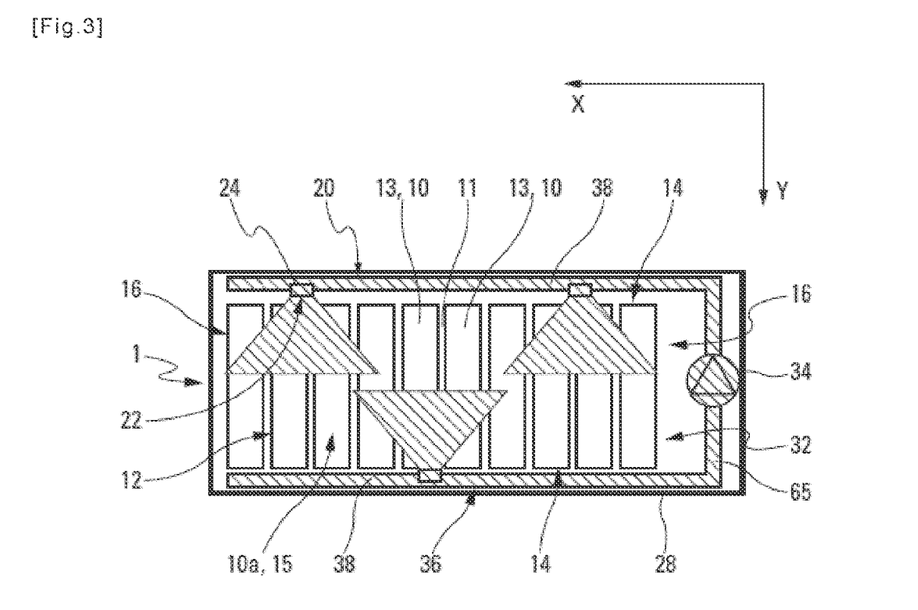
FIG. 3 schematically shows a top view of a battery according to the invention equipped with a second embodiment of a dielectric fluid circuit, with a cover for said battery having been removed.
Figure 4:
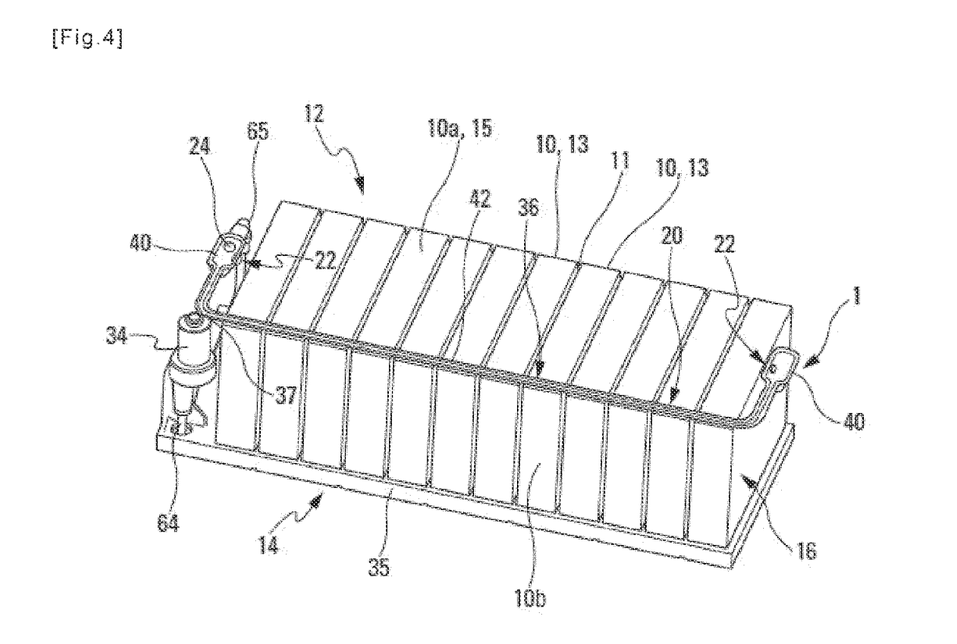
FIG. 4 shows a perspective view of a battery according to the invention equipped with a third embodiment of a dielectric fluid circuit, with only the inside of the battery having been shown.

As shown in FIGS. 2 to 4, the ramp 36, then called upper ramp, extends along one or more transverse edge(s) and/or one or more longitudinal edge(s) of said upper side 12 of the row of cells 10.

In FIGS. 2 and 3, the upper ramp 36 comprises one or more longitudinal branch(es) 38 extending along one or more longitudinal edge(s) of the upper side 12 of the row or of the rows of cells 10, with the one or said longitudinal branches 38 being provided with at least some of said spray orifices 22.

In FIG. 2, said spray orifices 22 are located, for example, opposite one of said longitudinal branches 38 to the other. In FIG. 3, they are located in a staggered manner. According to a variant, all or some of said spray orifices 22 are disposed opposite at least some of the spaces 11 between the cells 10.

In FIG. 2, said longitudinal branches 38 transversely overlap one of the or all of the longitudinal edges of said upper side 12 of the row. More specifically, in their width, i.e. in the transverse extension direction Y, a portion of the longitudinal branches 38 is located in line with the upper side 12 of the row of cells 10. Said longitudinal branches are thus located partially in line with the upper side 12, but only along its longitudinal edges and not in the central part of said upper side 12. In FIG. 3, said longitudinal branches 38 are located completely set back from the cells 10, in said transverse extension direction Y.

In FIG. 2, said longitudinal branches 38 extend toward each other along the transverse edges of the upper side 12 of the row 1 in order to form a ring. The portions of the ring running along the transverse edges are set back from the cells, in the longitudinal extension direction X. They are also provided with spray orifices 22. In FIG. 3, said longitudinal branches 38 have a free distal end.

In FIG. 4, the upper ramp 36 comprises one or more transverse branch(es) 40 extending along one of the or all of the transverse edges of said upper side 12 of the row or of the rows of cells, with the one or said transverse branch(es) 40 being provided with at least some of said spray orifices 22, in this case with all the spray orifices 22. The upper ramp 36 comprises a connection branch 42 connecting said transverse branches 40, called spray branches. Said connection branch 42 supplies said spray branches 40 with dielectric fluid. In other words, said connection branch 42 does not comprise a spray orifice. Said connection branch 42 optionally has a small diameter relative to that of the lateral branches 40. In the example shown, a single spray orifice 22 is provided per transverse branch 40.

Said connection branch 42 transversely overlaps one of the longitudinal edges of said upper side 12 of the row. More specifically, in its width, i.e. in the transverse extension direction Y, a portion of the connection branch 42 is located in line with the upper side 12 of the row of cells 10. Therefore, said longitudinal branch is located partially in line with the upper side 12, but only along one of its longitudinal edges and not in the central part of said upper side 12. Said spray branches 40 are located set back from the cells 10, in said longitudinal direction X. In this case, said connection branch 42 extends as a bend along the transverse edges of the row of cells 10 toward each of the spray branches 40, with said spray branches defining an enlarged volume chamber.

Figure 7:
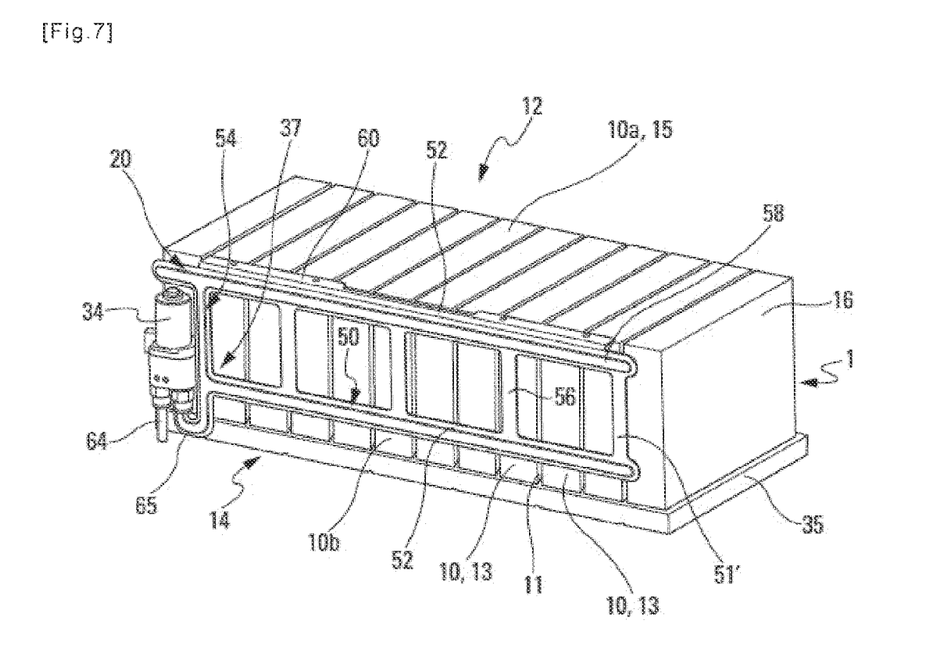
FIG. 7 shows a perspective view of a battery according to the invention equipped with a fifth embodiment of a dielectric fluid circuit, with only the inside of the battery having been shown.
Figure 8:
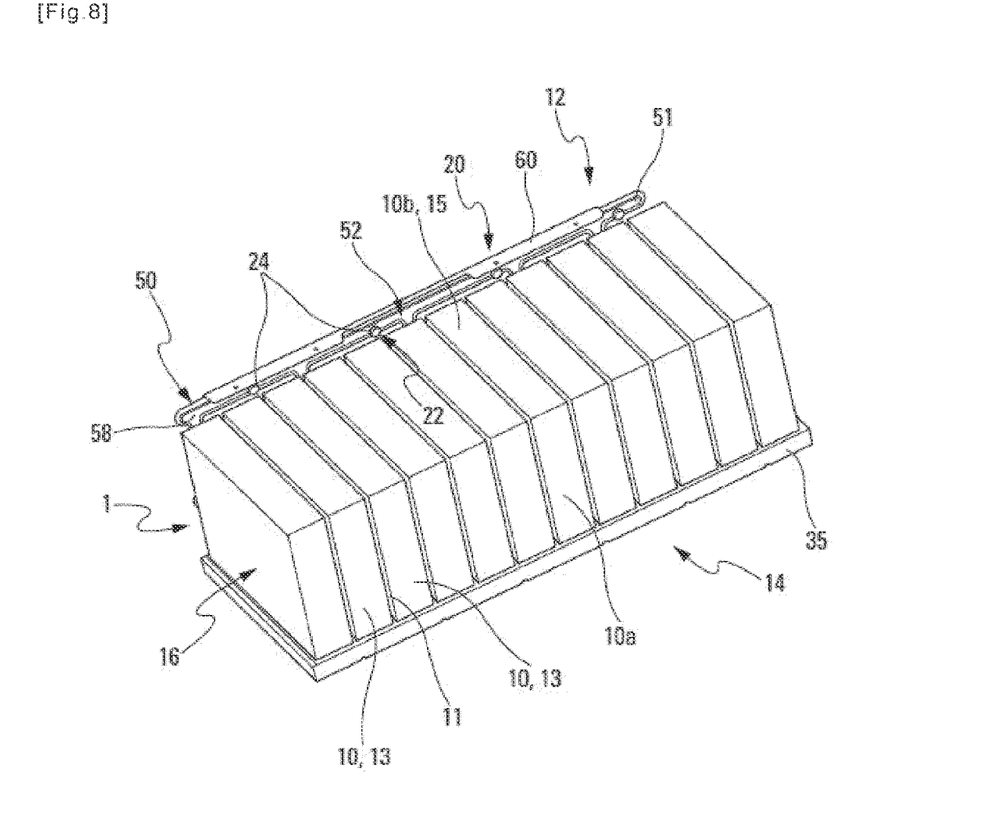
FIG. 8 shows FIG. 7 at another viewing angle.

As shown in FIGS. 7 and 8, the ramp 50, then called lateral ramp, is located opposite one of the lateral sides 14, called the first lateral side, of the row of cells 10.

The lateral ramp 50 comprises, for example, one or more longitudinal branch(es) 52 extending opposite said first side, with the one or said longitudinal branches 52 being provided with at least some of said spray orifices 22, in this case all the spray orifices 22.

The lateral ramp 50 further comprises a connection branch 54 connecting said longitudinal branches 52, called spray branches, in this case two branches. Said connection branch 54 supplies said spray branches 52 with dielectric fluid. In this case, said spray branches 52 are oriented in said longitudinal extension direction X and are therefore parallel to each other. Said connection branch 54 is oriented perpendicular to said spray branches 52.

A first one of said spray branches 52 is located in the vicinity of an upper longitudinal edge of said first lateral side. Another one of said spray branches 52 is located in the vicinity of a lower longitudinal edge of said first lateral side.

The lateral ramp 50 also advantageously comprises spacers 56 connecting said spray branches. In this case, said spacers are oriented in said height extension direction Z and are thus parallel to the connection branch 54. No fluid circulates in said spacers 56.

The spray orifices 22 are advantageously evenly disposed along said spray branches 52. In this case, they are disposed opposite some of the spaces 11 between the cells 10. Said connection branch 54 does not comprise a spray orifice.

The lateral ramp 50 comprises, for example, two plates 51, 51' connected face-to-face to mutually form said spray 52 and connection 54 branches, as well as the spacers 56. Each of said plates 51, 51' has channels 58, particularly formed by stamping, located opposite each other and defining a duct for circulating dielectric fluid in said spray 52 and connection 54 branches.

One 51 of said plates is located opposite said first lateral side. Said spray nozzles 24 are fixed thereto in passages provided in the thickness thereof to this end.

In this case, said plates 51, 51' comprise two fixing skirts 60 extending around one of the longitudinal edges of the row of cells 10. Said skirts 60 extend, for example, from said spray branch 52 located in the vicinity of an upper longitudinal edge of said first lateral side. Said skirts 60 cover some of said nozzles 24. As a variant, the one or said skirt(s) can be formed by only one of said plates, for example, the plate 51' not supporting the spray nozzles 24.

Cumulatively or independently of the above, the pump 34 is located opposite the first lateral side 14, in this case in the vicinity of the connection branch 54.

As shown in FIG. 5, said circuit 20 comprises at least one spray plate 62, provided with the one or with said spray orifice(s) 22. Like the lateral ramp 50, said plate 62 is located opposite one of said lateral sides of the row or of the rows of cells 10. Said spray plate 62 internally defines a dielectric fluid circulation chamber for supplying said spray orifices 22.

Figure 6:
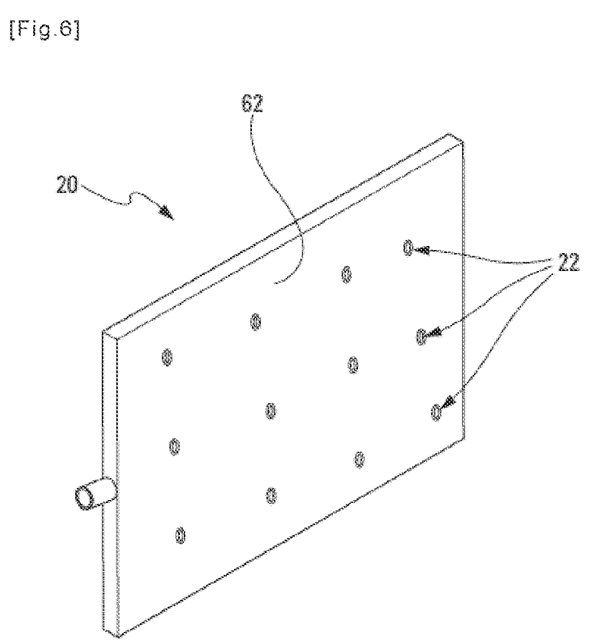
FIG. 6 schematically shows a perspective view of a plate of the dielectric fluid circuit shown in FIG. 5.

As is more clearly shown in FIG. 6, said spray orifices 22 are preferably evenly located on the surface of said plate 62.

More generally, the spray orifices 22 are evenly disposed in said longitudinal extension X and/or transverse Y directions, either in the vicinity of said spray branches 38, 40, 52, of said plate 62 or of any other element of the supply circuit 10.

In the various embodiments of the invention shown above, the circuit 20 further comprises one or more first tube(s) 64 connecting, on the one hand, said pump 34 and, on the other hand, said ramps 36, 50 and/or said spray plate 62. The circuit 20 can further comprise a second tube 65 connecting said reservoir 32 and said pump 34, for example, by passing through the base 35.

In the embodiment of FIGS. 7 and 8, said first tube 64 is defined by a portion of the channels 58 formed by said plates 51, 51'.

Advantageously, in addition to the cells 10, said base 35 supports the circuit 20, said pump 32 and/or said tubes 64, 65, so as to form an assembly ready to be mounted in said housing 25.

The invention claimed is:

1. A battery comprising:
   at least one row of energy storage cells, said row having a longitudinal extension direction, with an upper side and lateral sides of the row being respectively defined by a series of upper and lateral faces of the energy storage cells and of spaces separating said energy storage cells in said longitudinal extension direction,
   a dielectric fluid circuit comprising one or more spray orifice(s) of said energy storage cells, said one or more spray orifice(s) being flush with the upper side of the row and/or being located facing at least one of the lateral sides of said row so that said dielectric fluid circuit leaves the upper side of the row free,
   wherein the dielectric fluid circuit comprises at least one spray ramp provided with the one or more spray orifices,
   wherein the at least one spray ramp is at least partially on a vertical level immediately above a vertical level of the upper face of the energy storage cells,
   wherein the at least one spray ramp is an upper ramp that extends along one or more lateral edge(s) and/or one or more longitudinal edge(s) of said upper side of the row or of the rows of energy storage cells,
   wherein the upper ramp comprises one or more longitudinal branch(es) extending along one or more longitudinal edge(s) of the upper side of the row or of the rows of energy storage cells, the one longitudinal branch or said longitudinal branches being provided with at least some of said spray orifices, said upper ramp forming a ring.

2. The battery as claimed in claim 1,
   wherein the space between the energy storage cells of the row of energy storage cells ranges between 1 and 10 mm.

3. The battery as claimed in claim 1,
   comprising a condensation plate located facing the upper face of the energy storage cells, with a distance separating said condensation plate from the energy storage cells ranging between 5 and 10 mm.

4. The battery as claimed in claim 1,
   wherein the upper ramp comprises one or more transverse branch(es) extending along one or more transverse edge(s) of said upper side of the row or of the rows of energy storage cells, the one branch or said branches being provided with at least some of said spray orifices, the upper ramp comprising a connection branch connecting said transverse branches, called spray branches.

5. The battery as claimed in claim 1,
   wherein the at least one ramp is located opposite of one of the lateral sides, called first lateral side, of the row or of the rows of energy storage cells, the lateral ramp comprising one or more longitudinal branch(es) extending opposite said first side, the one longitudinal branch or said longitudinal branches being provided with at least some of said spray orifices.

6. The battery as claimed in claim 5,
   wherein the lateral ramp comprises two plates connected to mutually form said longitudinal branches.

7. The battery as claimed in claim 1,
   wherein said dielectric fluid circuit comprises at least one spray plate, provided with the spray orifice or said spray orifices, said plate being located opposite one of said lateral sides of the row or of the rows of energy storage cells.

8. A battery comprising:
   a plurality of cells arranged in a row, said row having a longitudinal extension direction, with an upper side and lateral sides of the row being respectively defined by a series of upper and lateral faces of each of the plurality of cells and of spaces separating said cells in said longitudinal extension direction, wherein each space defines an identical distance between neighboring cells;
   a dielectric fluid circuit comprising one or more spray orifice(s) of said plurality of cells, said one or more spray orifice(s) being flush with the upper side of the row and/or being located facing at least one of the lateral sides of said row so that said dielectric fluid circuit leaves the upper side of the row free,
   wherein the dielectric fluid circuit comprises at least one spray ramp provided with the one or more spray orifices,
   wherein the at least one spray ramp is at least partially on a vertical level immediately above a vertical level of the upper face of cells,
   wherein the at least one spray ramp is an upper ramp that extends along one or more lateral edge(s) and/or one or more longitudinal edge(s) of said upper side of the row or of the rows of cells,
   wherein the upper ramp comprises one or more longitudinal branch(es) extending along one or more longitudinal edge(s) of the upper side of the row or of the rows of cells, the one longitudinal branch or said longitudinal branches being provided with at least some of said spray orifices, said upper ramp forming a ring.

* * * * *